United States Patent
Han et al.

(10) Patent No.: US 12,019,479 B2
(45) Date of Patent: Jun. 25, 2024

(54) FLEXIBLE DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventors: Wen Han, Wuhan (CN); Zhuo Zhang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 760 days.

(21) Appl. No.: 17/251,774

(22) PCT Filed: Jul. 29, 2020

(86) PCT No.: PCT/CN2020/105524
§ 371 (c)(1),
(2) Date: Dec. 11, 2020

(87) PCT Pub. No.: WO2022/000672
PCT Pub. Date: Jan. 6, 2022

(65) Prior Publication Data
US 2022/0011821 A1    Jan. 13, 2022

(30) Foreign Application Priority Data
Jun. 30, 2020 (CN) .......................... 202010612474.7

(51) Int. Cl.
*G06F 1/16* (2006.01)

(52) U.S. Cl.
CPC ................................ *G06F 1/1652* (2013.01)

(58) Field of Classification Search
CPC ............................ G06F 1/1652; G06F 1/1624
See application file for complete search history.

(56) References Cited

U.S. PATENT DOCUMENTS

| 10,082,833 | B2* | 9/2018 | Chen | G06F 1/1652 |
| 10,582,629 | B2* | 3/2020 | Xu | H05K 5/0017 |
| 10,976,775 | B1* | 4/2021 | Cha | H05K 7/1401 |
| 11,219,132 | B2* | 1/2022 | Song | G06F 1/1624 |

(Continued)

FOREIGN PATENT DOCUMENTS

| CN | 202728121 U | 2/2013 |
| CN | 106971673 A | 7/2017 |

(Continued)

*Primary Examiner* — Abhishek M Rathod
(74) *Attorney, Agent, or Firm* — PV IP PC; Wei Te Chung; Zhigang Ma

(57) ABSTRACT

The present disclosure provides a flexible display device. A first supporting assembly and a second supporting assembly are configured to slide relatively to provide a supporting surface with variable area to a flexible display module. A limiting mechanism includes a limiting rotor and a limiting groove, wherein the limiting rotor is rotatably connected to the first supporting assembly, the limiting groove is defined in the second supporting assembly, and the limiting rotor is engaged with the limiting groove when an area of the supporting surface is a predetermined area.

16 Claims, 7 Drawing Sheets

(56) References Cited

U.S. PATENT DOCUMENTS

| | | | |
|---|---|---|---|
| 11,315,443 B2* | 4/2022 | Han ..................... | G06F 1/1652 |
| 11,775,016 B2* | 10/2023 | Choi .................... | G06F 1/1681 |
| | | | 361/679.01 |
| 2014/0031088 A1* | 1/2014 | Nakamura ............ | G06F 1/1624 |
| | | | 455/566 |
| 2017/0360170 A1* | 12/2017 | Lin ...................... | A45C 13/004 |
| 2021/0366318 A1* | 11/2021 | Feng .................... | G06F 1/1652 |
| 2022/0130287 A1* | 4/2022 | Feng .................... | G09F 9/301 |
| 2022/0240400 A1* | 7/2022 | Zhou .................... | G09F 9/301 |
| 2022/0254281 A1* | 8/2022 | Zhang .................. | G09F 9/301 |

FOREIGN PATENT DOCUMENTS

| | | |
|---|---|---|
| CN | 107408358 A | 11/2017 |
| CN | 107820627 A | 3/2018 |
| CN | 110493398 A | 11/2019 |
| CN | 110599912 A | 12/2019 |
| CN | 110706600 A | 1/2020 |
| CN | 110718149 A | 1/2020 |
| CN | 210865437 U | 6/2020 |
| KR | 20140066064 A | 5/2014 |

* cited by examiner

FLEXIBLE DISPLAY DEVICE

RELATED APPLICATIONS

This application is a Notional Phase of PCT Patent Application No. PCT/CN2020/105524 having international filing date of Jul. 29, 2020, which claims the benefit of priority of Chinese Patent Application No. 202010612474.7 filed on Jun. 30, 2020. The contents of the above applications are all incorporated by reference as if fully set forth herein in their entirety.

FIELD OF INVENTION

The present disclosure relates to the field of display technology, and in particular to a flexible display device.

BACKGROUND OF INVENTION

Application of flexible display devices is increasingly favored by the market. Flexible screen mobile phones refer to mobile phones with bendable and flexible screens. Compared with traditional screens, flexible screens have obvious advantages. They are not only lighter and thinner in size, but also lower in power consumption than traditional light-emitting devices, which help to improve equipment endurance. At the same time, based on bendable and flexible characteristics, their durability is also much higher than traditional screens, thereby reducing a probability of accidental damage to flexible display devices. In addition to outer folding and inner folding, there are many other ways to unfold the flexible screens, wherein the unfolding method of rolling and stretching is one of them. However, it is difficult for the flexible display screens to be fixed at a predetermined position during a rolling and stretching process.

Therefore, it is necessary to propose a technical solution to provide a rollable flexible display device that can stay at a predetermined position.

SUMMARY OF INVENTION

The object of the present disclosure is to provide a flexible display device that can stably fix the flexible display device when an area of the supporting surface is a predetermined area.

To achieve the above object, the present disclosure provides a flexible display device, the flexible display device including:
  a flexible display module;
  a supporting mechanism including a first supporting assembly and a second supporting assembly disposed corresponding to each other, the first supporting assembly and the second supporting assembly are configured to slide relatively to provide a supporting surface with variable area to the flexible display module, and
  a limiting mechanism including a limiting rotor and a limiting groove, the limiting rotor rotatably connected to the first supporting assembly, the limiting groove defined in the second supporting assembly, wherein the limiting rotor engaged with the limiting groove when an area of the supporting surface is a predetermined area.

In the above-mentioned flexible display device, the limiting mechanism further including a sliding groove is defined in the second supporting assembly, and the limiting rotor sliding along the sliding groove when the first supporting assembly and the second supporting assembly slide relatively.

In the above-mentioned flexible display device, the limiting mechanism further comprising a rotation auxiliary member provided on the second supporting assembly and corresponding to the sliding groove, the sliding groove and the limiting groove located on same end surface of the second supporting assembly and correspondingly arranged,
  the limiting rotor configured to move relative to the rotation auxiliary member according to a preset trajectory when in a second state and abuts against the rotation auxiliary member, so as to rotate 90 degrees in the first direction from the second state to a first state,
  wherein the limiting rotor is in the first state when the limiting rotor clamped to the limiting groove; and
  the limiting rotor is in the second state when the limiting rotor slides along the sliding groove.

In the above-mentioned flexible display device, the limiting rotor configured to rotate in the first direction to a first transition state when in the second state and abuts against the rotation auxiliary member;
  the limiting rotor also configured to rotate in the first direction to a second transition state under the action of inertial force when in the first transition state; and
  the limiting rotor also configured to rotate in the first direction to the first state when in the second transitional state and abuts against the rotation auxiliary member.

In the above flexible display device, the limiting rotor including a first end and a second end disposed corresponding to each other, the limiting rotor further including a third end and a fourth end disposed corresponding to each other, the third end connected between the first end and the second end, the fourth end connected between the first end and the second end, wherein the first end and the second end disposed corresponding to each other of the limiting rotor are both engaging ends, and the third end and the fourth end disposed corresponding to each other of the limiting rotor are both sliding ends;
  the first end or the second end of the limiting rotor engaged with the limiting groove when the limiting rotor is engaged with the limiting groove;
  the third end or the fourth end of the limiting rotor located in the sliding groove when the limiting rotor is in the second state; and
  an interface between the engaging end and the sliding end of the limiting rotor in contact with the sliding groove when the limiting rotor is in the first transition state and the second transition state.

In the above-mentioned flexible display device, the rotation auxiliary member provided on the second end surface of the second supporting assembly, the sliding groove is defined in a first end surface of the second supporting assembly, the first end surface and the second end surface perpendicular to each other, and the limiting groove located at a end of the sliding groove close to the rotation auxiliary member.

In the above-mentioned flexible display device, the first end surface located on a back of the supporting surface and parallel to the supporting surface, the second end surface located on the back of the supporting surface and perpendicular to the supporting surface.

In the above flexible display device, the predetermined area corresponds to a maximum area of the supporting surface.

In the above flexible display device, the rotation auxiliary member comprising a V-shaped protrusion, the limiting rotor comprising a V-shaped groove, and an angle of a vertex angle of the V-shaped protrusion different from an angle of a vertex angle of the V-shaped groove.

In the above flexible display device, the angle of the vertex angle of the V-shaped protrusion is less than the angle of the vertex angle of the V-shaped groove.

In the above-mentioned flexible display device, the first supporting assembly including a plurality of first support plates, the second supporting assembly including a plurality of second support plates, each of the second support plates located between two adjacent first support plates, and the first support plate and the second support plate engaged with each other in a direction perpendicular to the supporting surface.

In the above-mentioned flexible display device, a longitudinal section of the first support plate is one of a T-shaped or an inverted T-shaped, and a longitudinal section of the second support plate is another one of the T-shaped or the inverted T-shaped.

In the above flexible display device, the longitudinal section of the first support plate is the inverted T-shaped, and the longitudinal section of the second support plate is the T-shaped,
 a surface of the second supporting assembly close to the supporting surface provided with a plurality of protruding strips, a gap provided between two adjacent protruding strips, the first support plate provided on a portion of two adjacent protruding strips, the second support plate arranged in a portion of the gap, and wherein a gap between the two adjacent protruding strips where the first support plate is disposed is adjacent to the gap where the second support plate is arranged in.

In the above-mentioned flexible display device, t the flexible display device further comprising a rolling mechanism, the rolling mechanism fixedly connected to the first supporting assembly, and the flexible display module comprising a protective cover plate; and
 a first end of the protective cover plate fixed to the rolling mechanism, a second end of the protective cover plate fixed to the second supporting assembly, and the first end of the protective cover plate opposite to the second end of the protective cover plate.

In the above-mentioned flexible display device, the first support plate comprising a first vertical portion and a first lateral portion perpendicular to the first vertical portion, the first vertical portion located in a middle position of the first lateral portion, the second support plate comprising a second vertical portion and a second lateral portion perpendicular to the second vertical portion, the second vertical portion located in a middle position of the second lateral portion, the first lateral portion of the first support plate and the second lateral portion of the second support plate engaged with each other, the first vertical portion of the first support plate and the second lateral portion of the second support plate constituting the supporting surface, the first lateral portion of the first support plate disposed on two adjacent protruding strips, and the second vertical portion of the second support plate disposed in the gap.

In the above flexible display device, the protective cover plate comprising a stretch-resistant layer, and a material of the stretch-resistant layer is selected from transparent polyimide or polyethylene terephthalate.

In the above-mentioned flexible display device, the flexible display device further comprising a one-way damping mechanism, the rolling mechanism comprising a rolling shaft and a rolling spring assembly, the rolling spring assembly connected to a first end of the rolling shaft, and configured to apply a driving force to the rolling shaft to rotate in a second direction, the one-way damping mechanism connected to a second end of the rolling shaft and configured to apply a second direction rotate resistance to the rolling shaft, the first end of the rolling shaft opposite to the second end of the rolling shaft.

In the above flexible display device, the rolling mechanism further comprising a reel, the reel comprising an accommodating cavity, the rolling shaft disposed in the accommodating cavity of the reel, the rolling spring assembly comprising a coil spring and a first end cover, one end of the coil spring connected to the rolling shaft, another end of the coil spring connected to the first end cover, the first end cover fixedly connected to the reel.

The present disclosure provides a flexible display device. The flexible display device includes: a flexible display module and a supporting mechanism. The supporting mechanism includes a first supporting assembly and a second supporting assembly disposed corresponding to each other, wherein the first supporting assembly and the second supporting assembly are configured to slide relatively to provide a supporting surface with variable area to the flexible display module; and a limiting mechanism including a limiting rotor and a limiting groove, wherein the limiting rotor is rotatably connected to the first supporting assembly, the limiting groove is defined in the second supporting assembly, and the limiting rotor is engaged with the limiting groove when an area of the supporting surface is a predetermined area. The flexible display device is engaged with the limiting groove by the limiting rotor to stably fix the first supporting assembly and the second supporting assembly when they provide the predetermined area.

DETAILED DESCRIPTION OF PREFERRED EMBODIMENTS

The technical solutions in the embodiments of the present disclosure will be clearly and completely described below in conjunction with the figures in the embodiments of the present disclosure. Obviously, the described embodiments are only a part of the embodiments of the present disclosure, rather than all the embodiments. Based on the embodiments in the present disclosure, all other embodiments obtained by those skilled in the art without creative work fall within the protection scope of the present disclosure.

Figure 1:
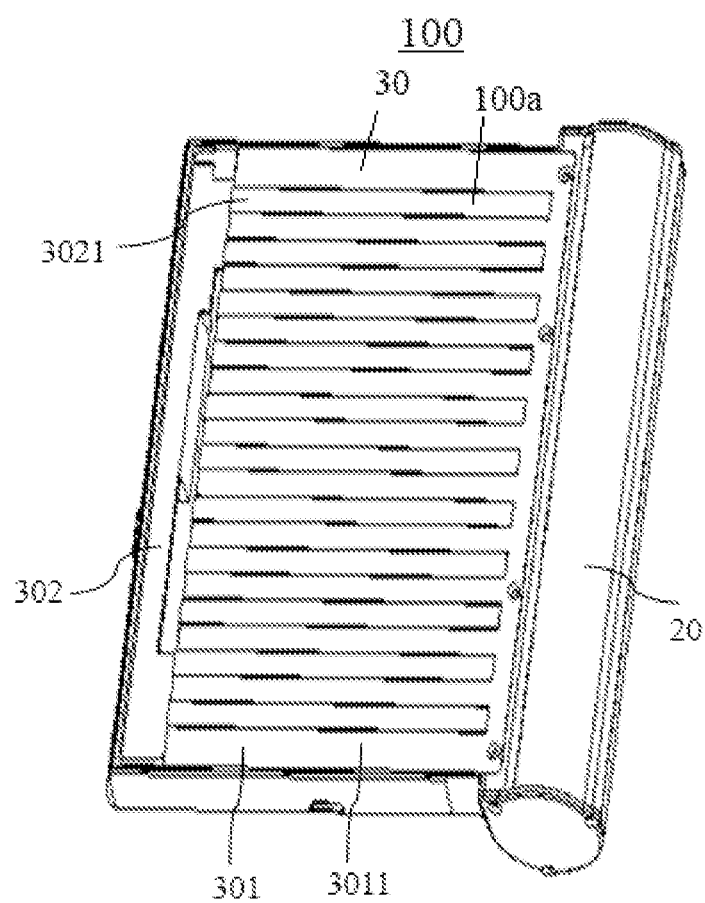
FIG. 1 is a schematic diagram of one viewing angle when a flexible display device of the present disclosure is in a fully wound state.
Figure 2:
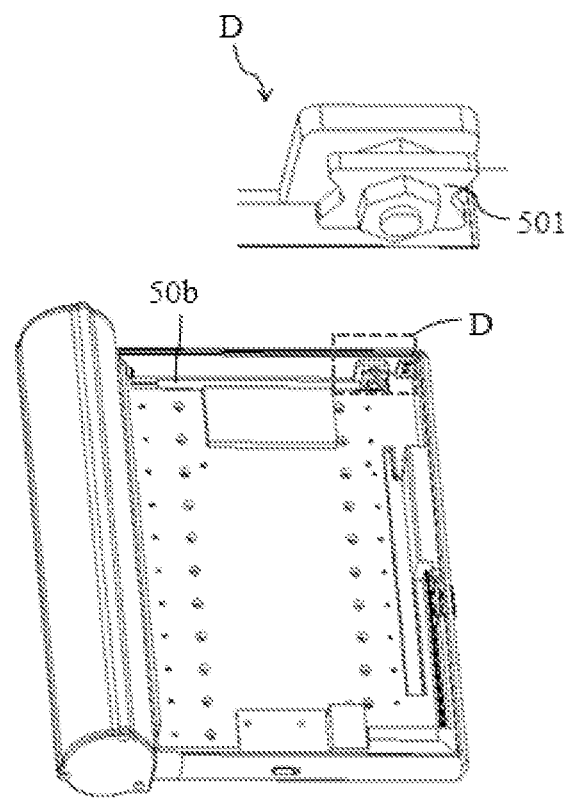
FIG. 2 is a schematic diagram of another viewing angle when the flexible display device shown in FIG. 1 is in the fully wound state.
Figure 3:
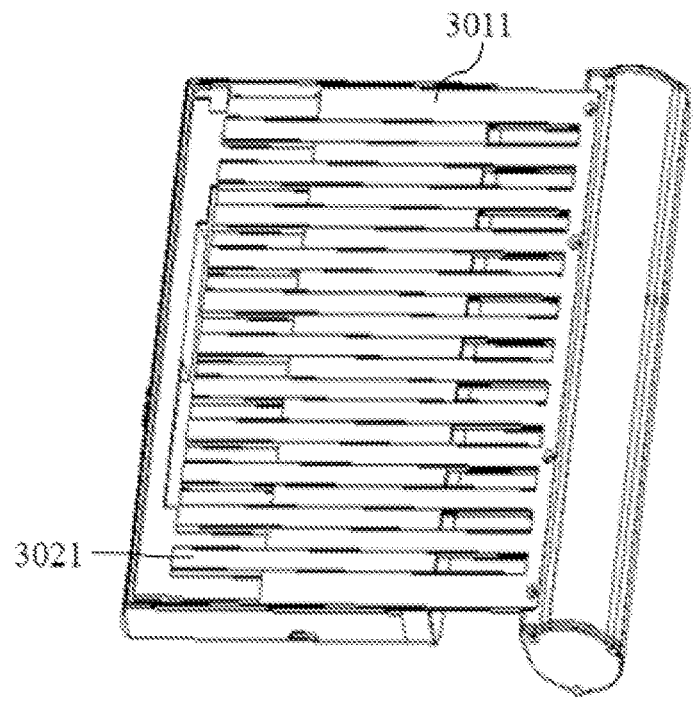
FIG. 3 is a first schematic diagram when the flexible display device shown in FIG. 1 is in a partially wound state.
Figure 4:
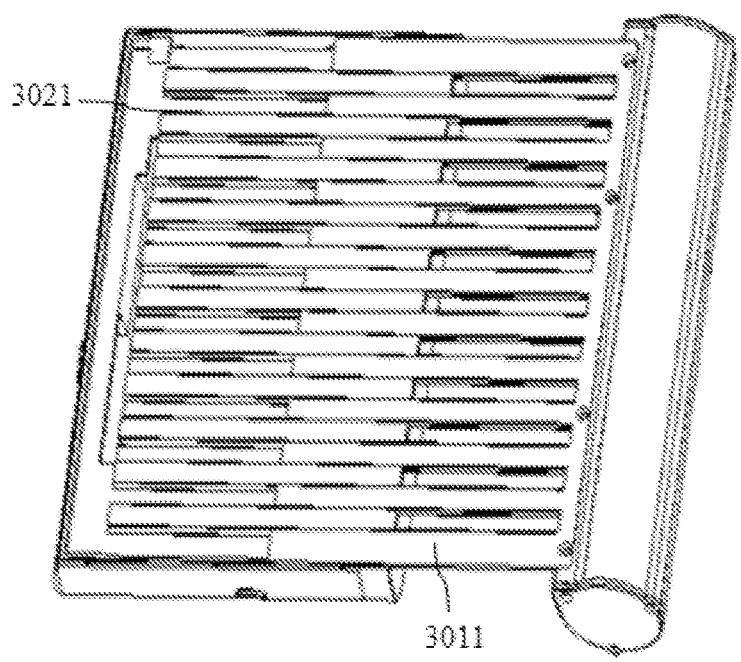
FIG. 4 is a second schematic diagram of one viewing angle when the flexible display device shown in FIG. 1 is in the partially wound state.
Figure 5:
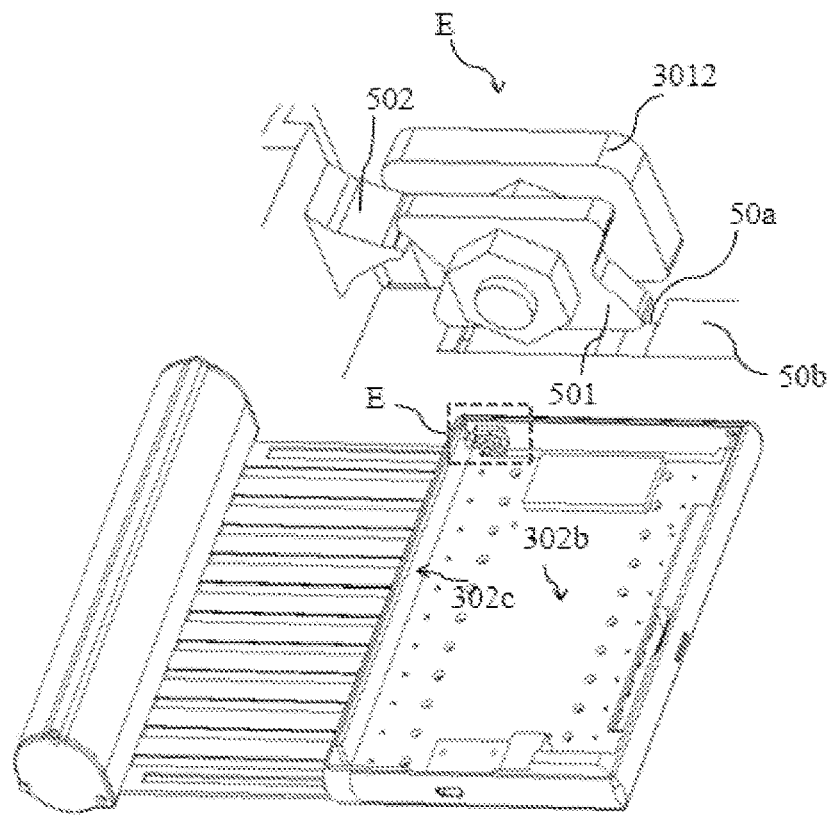
FIG. 5 is a schematic diagram of another viewing angle when the flexible display device shown in FIG. 4 is in the partially wound state.
Figure 6:
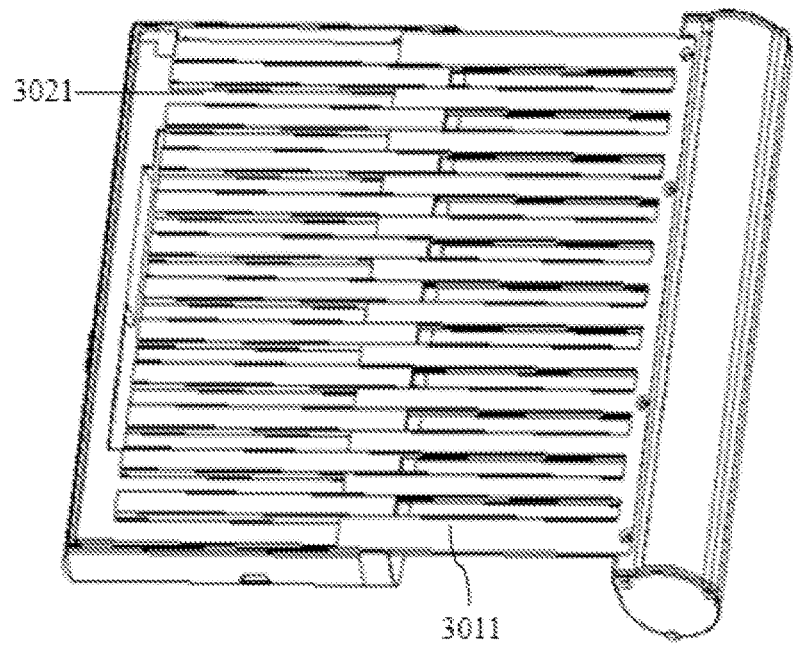
FIG. 6 is a schematic diagram when the flexible display device shown in FIG. 1 is in a fully expanded state.
Figure 7:
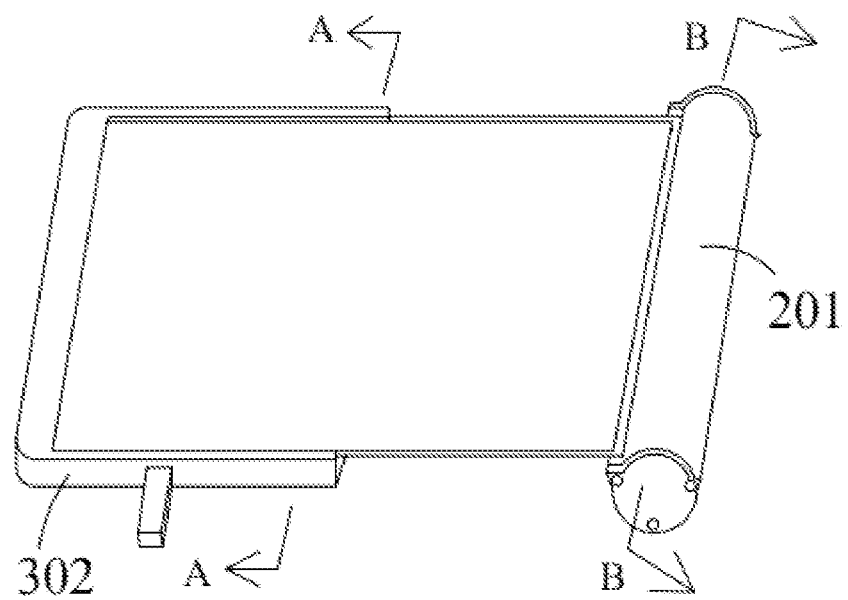
FIG. 7 is a third schematic diagram of the flexible display device when it is in the partially wound state.
Figure 8:
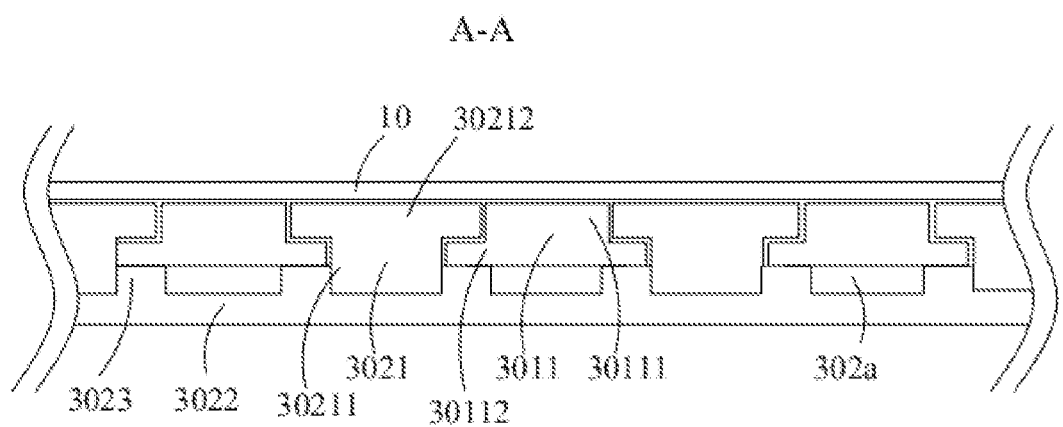
FIG. 8 is a schematic cross-sectional view taken along an A-A tangent line of the flexible display device shown in FIG. 7.
Figure 9:
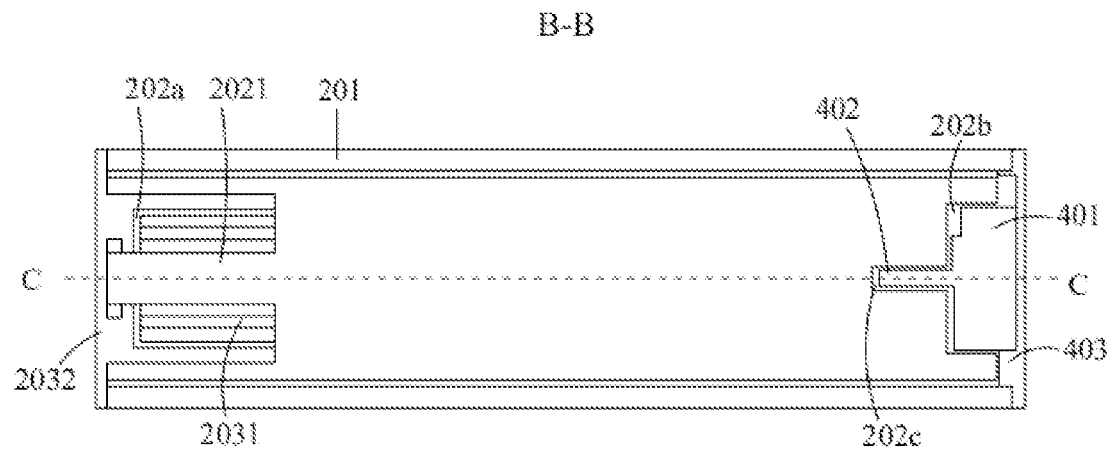
FIG. 9 is a schematic cross-sectional view taken along a B-B tangent line of the flexible display device shown in FIG. 7.
Figure 10:
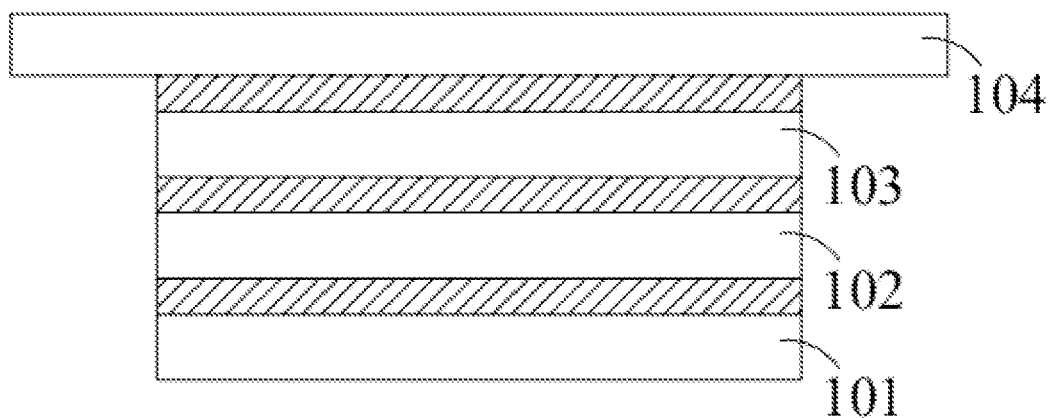
FIG. 10 is a schematic diagram of a flexible display module according to one embodiment of the present disclosure.
Figure 11:
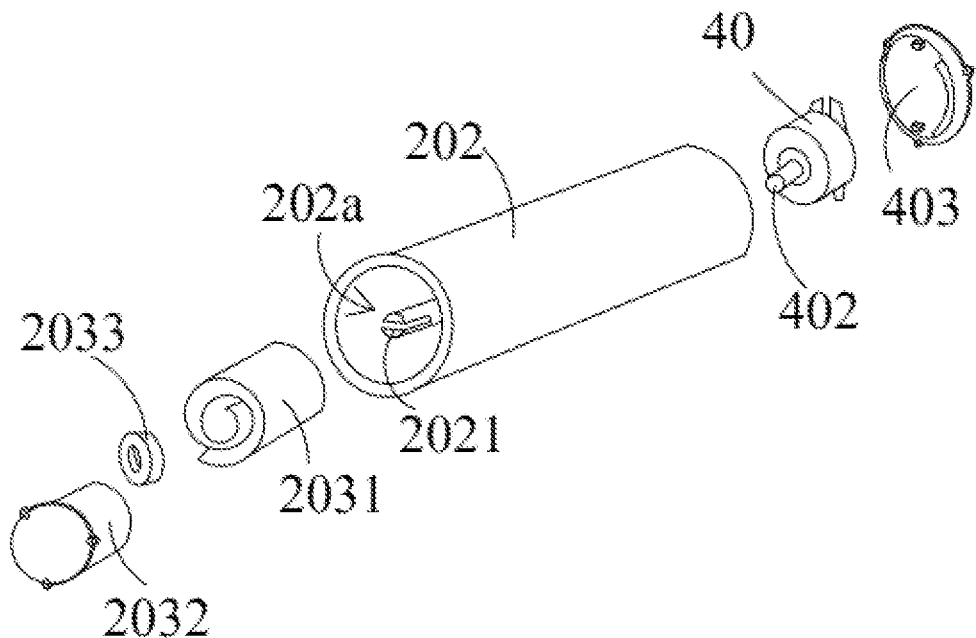
FIG. 11 is a schematic diagram of a rolling mechanism and a one-way damping mechanism of the flexible display device according to one embodiment of the present disclosure.
Figure 12:
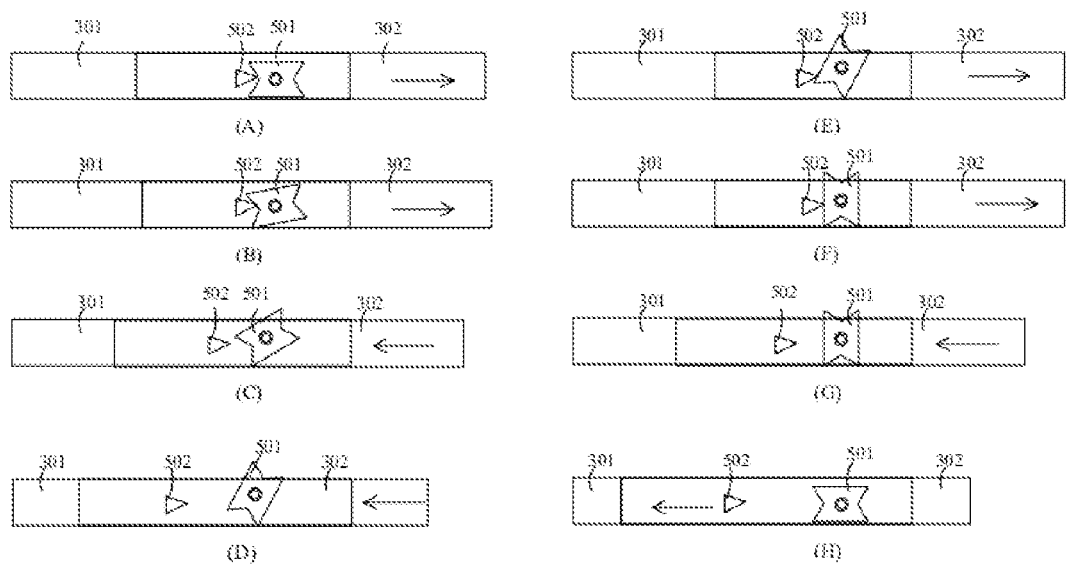
FIG. 12 is a schematic diagram of a process of rotating a limiting rotor of the flexible display device from a second state to a first state according to one embodiment of the present disclosure.

Please refer to FIG. 1 to FIG. 12. FIG. 1 is a schematic diagram of one viewing angle when a flexible display device of the present disclosure is in a fully wound state. FIG. 2 is a schematic diagram of another viewing angle when the flexible display device shown in FIG. 1 is in the fully wound state. FIG. 3 is a first schematic diagram when the flexible display device shown in FIG. 1 is in a partially wound state. FIG. 4 is a second schematic diagram of one viewing angle when the flexible display device shown in FIG. 1 is in the partially wound state. FIG. 5 is a schematic diagram of another viewing angle when the flexible display device shown in FIG. 4 is in the partially wound state. FIG. 6 is a schematic diagram when the flexible display device shown in FIG. 1 is in a fully expanded state. FIG. 7 is a third schematic diagram of the flexible display device when it is in the partially wound state. FIG. 8 is a schematic cross-sectional view taken along an A-A tangent line of the flexible display device shown in FIG. 7. FIG. 9 is a schematic cross-sectional view taken along a B-B tangent line of the flexible display device shown in FIG. 7. FIG. 10 is a schematic diagram of a flexible display module according to one embodiment of the present disclosure. FIG. 11 is a schematic diagram of a rolling mechanism and a one-way damping mechanism of the flexible display device according to one embodiment of the present disclosure. FIG. 12 is a schematic diagram of a process of rotating a limiting rotor of the flexible display device from a second state to a first state according to one embodiment of the present disclosure.

The present disclosure provides a flexible display device, which is a rollable display device. The flexible display device 100 includes a flexible display module 10, a rolling mechanism 20, a supporting mechanism 30, a one-way damping mechanism 40 and a limiting mechanism 50.

The flexible display module 10 is configured to display images. The flexible display module 10 is configured to roll and stretch to switch a size of display surface. An area of the display surface in an unfolded state of the flexible display module 10 is smallest when the flexible display device 100 is in a fully rolled state, and the flexible display device 100 can be used as a mobile phone. The area of the display surface in the unfolded state of the flexible display module 10 is increased when the flexible display device 100 is in a partially rolled state. The area of the display surface in the unfolded state of the flexible display module 10 is largest when the flexible display device 100 is in a fully expanded state. The flexible display device 10 can be used as a tablet computer or a notebook computer when the flexible display device 10 is in the partially rolled state and the fully expanded state.

As shown in FIG. 10, the flexible display module 10 includes a rear cover 101, a flexible organic light-emitting diode display panel 102, a polarizer 103, and a protective cover plate 104 that are sequentially stacked. Any adjacent two of the rear cover 101, the flexible organic light-emitting diode display panel 102, the polarizer 103, and the protective cover plate 104 are connected by a transparent adhesive layer.

In this embodiment, a length of the protective cover plate 104 is longer than a length of the flexible organic light-emitting diode display panel 102, one end of the protective cover plate 104 is fixed to the rolling mechanism 20, and the other end of the protective cover plate 104 is fixed to a second supporting assembly to provide a stretch layer for the rolling and stretching of the flexible display module 10. Specifically, one end of the protective cover plate 104 is attached or locked to an inner surface of the second supporting assembly 302 (middle frame box), and another end of the protective cover plate 104 is attached or fixed on the reel. The protective cover plate 104 is the outermost layer of the flexible display module 10. The protective cover plate 104 is in a tensioned state under an action of external force, which provides the flexible display module 10 with a flat display surface and a hardness of the protective cover 104 increased accordingly. If the protective cover plate 104 is damaged during the use of the flexible display device 10, it is more convenient to replace the protective cover plate 104. By using the protective cover plate 104 as the stretching layer, damage to key functional layers such as the flexible organic light-emitting diode display panel 102 can be prevented, while service life of the flexible display device 100 can be increased. Compared with using multiple film layers of the flexible display module 10 as a stretched layer, it can prevent peeling between the film layers caused by a difference in deformation during the film rolling process.

In this embodiment, the protective cover plate 104 includes a stretch-resistant layer. A preparation material of the stretch-resistant layer is an optical-grade stretch-resistant material, such as clear polyamide (CPI) or polyethyleneterephthalate (PET). The protective cover plate 104 also includes a hardened layer, and the hardened layer is formed inside the protective cover plate 104 to improve a hardness of the protective cover plate 104. The hardened layer may be an inorganic layer, such as a silicon nitride layer or a silicon oxide layer; the hardened layer may also be an organic layer, such as an organic silicon layer. The hardened layer is disposed on the portion of the protective cover plate 104 corresponding to the display area to improve the protection of the display surface of the flexible display device.

In this embodiment, the supporting mechanism 30 includes a first supporting assembly 301 and a second supporting assembly 302 disposed corresponding to each other.

The first supporting assembly 301 and the second supporting assembly 302 are configured to slide relatively to provide a supporting surface 100a which changes in area to the flexible display module 10. An area of the supporting surface 100a is reduced when the first supporting assembly 301 and the second supporting assembly 302 slide toward each other, and correspondingly, the flexible display module 10 is rolled up to reduce the display surface; the area of the supporting surface 100a increases when the first supporting assembly 301 and the second supporting assembly 302 slide backwards, and correspondingly, the flexible display module 10 expands to increase the display surface. The area of the supporting surface 100a is the smallest when the flexible display device 100 in a fully rolled state, as shown in FIG. 1. The area of the supporting surface 100a is the largest when the flexible display device in a fully expanded state, as shown in FIG. 6.

The first supporting assembly 301 has a comb tooth shape. The first supporting assembly 301 includes a plurality of first support plates 3011, and a gap between two adjacent first support plates 3011 is equal. The second supporting assembly 302 includes a plurality of second support plates 3021, and a distance between any two adjacent second support plates 3021 is equal. Each of the second support plates 3021 is located between two adjacent first support plates 3011. The first support plate 3011 and the second support plate 3021 are engaged with each other in a direction perpendicular to the supporting surface 100a to limit the first support plate 3011 and the second support plate 3021 in the direction perpendicular to the supporting surface 100a to prevent the first support plate 3011 and the second support plate 3021 from moving relative to each other in a direction perpendicular to the supporting surface 100a, which causes the supporting surface 100a to be uneven and the flexible display module 10 to have uneven display.

In this embodiment, a longitudinal section of the first support plate 3011 has one of a T-shape or an inverted T-shape, and a longitudinal section of the second support plate 3021 has the other one of the T-shape or the inverted T-shape, so that the support plate 3011 and the second support plate 3021 engage with each other in a direction perpendicular to the supporting surface 100a.

Specifically, as shown in FIG. 8, the longitudinal section of the first support plate 3011 is the inverted T shape, and the longitudinal section of the second support plate 3021 is the T shape. The first support plate 3011 includes a first vertical portion 30111 and a first lateral portion 30112 perpendicular to the first vertical portion 30111, and the first vertical portion 30111 is located in the middle of the first lateral portion 30112. The second support plate 3021 includes a second vertical portion 30211 and a second horizontal portion 30212 perpendicular to the second vertical portion 30211, and the second vertical portion 30211 is located at a middle position in the second horizontal portion 30212. The first lateral portion 30112 of the first support plate 3011 and the second lateral portion 30212 of the second support plate 3021 engage with each other. The first vertical portion 30111 of the first support plate 3011 and the second lateral portion 30212 of the second support plate 3021 constitute the supporting surface 100a.

The second supporting assembly 302 further includes a supporting body 3022, and the supporting body 3022 is plate-shaped. The surface of the second supporting assembly 302 close to the supporting surface 100a is provided with a plurality of protruding strips 3023, a gap 302a is provided between two adjacent protruding strips 3023, and the first support plate 3011 is provided on part of the two adjacent protruding strips 3023. Each first support plate 3011 slides along two protruding strips 3023. The second support plates 3021 are arranged in a portion of the gap 302a, and each second support plate 3021 slides along an inner wall surrounding the gap 302a. The gap between the two adjacent protruding strips 3023 where the first support plate 3011 is disposed is adjacent to the gap where the second support plate 3021 is arranged in. There is a gap between the first support plate 3011 and a part of the surface of the second supporting assembly 302 close to the supporting surface 100a to reduce a friction of the first support plate 3011 in the sliding process, to make the first support plate 3011 slide more smoothly. Specifically, the first lateral portion 30112 of the first support plate 3011 is arranged on two adjacent protruding strips 3023, and the second vertical portion 30211 of the second support plate 3021 is arranged in the gap 302a.

A width of the first vertical portion 30111 of the first support plate 3011 is equal to a width of the second lateral portion 30212 of the second support plate 3021. A width of the second vertical portion 30211 of the second support plate 3021 is equal to a width of the gap 302a, and a width of the first lateral portion 30112 of the first support plate 3011 is equal to a sum of the width of the gap 302a and a width of two protruding strips 3023.

The rolling mechanism 20 includes a reel 201, a rolling shaft 202, and a rolling spring assembly. The reel 201 has an accommodating cavity, and the rolling shaft 202 is arranged in the accommodating cavity of the reel 201. The rolling spring assembly is connected to a first end of the rolling shaft 202 and is configured to apply a driving force to the rolling shaft 202 to rotate in a second direction. The one-way damping mechanism 40 is connected to a second end of the rolling shaft 202 and is configured to apply resistance to the rolling shaft 202 rotating in the second direction. The first end of the rolling shaft 202 and the second end of the rolling shaft 202 are disposed corresponding to each other, so that the flexible display device 100 can stay on any supporting surface 100a provided by the first supporting assembly 301 and the second supporting assembly 302, and make the display module 10 on the corresponding display surface, so that the flexible display device 100 can stay at any position to adapt to different display screen application scenarios. The second direction may be clockwise or counterclockwise.

The first end of the rolling shaft 202 is provided with a first groove 202a and a first connecting portion 2021 arranged in the first groove 202a and located on a rotation center axis C-C of the rolling shaft 202. The second end of the rolling shaft 202 is provided with a second groove 202b and a connecting hole 202c arranged on the rotation center axis C-C of the rolling shaft 202.

The rolling spring assembly includes a coil spring 2031, a first end cover 2032, and a bearing 2033. One end of the coil spring 2031 is connected to the first connecting portion 2021 of the rolling shaft 202, another end of the coil spring 2031 is connected to the first end cover 2032, and the coil spring 2031 is received in the first groove 202a. The bearing 2033 is sleeved on an end of the first connecting portion 2021 close to the first end cover 2032. The first end cover 3032 is fixed on the reel 201. The coil spring is configured to generate a rolling torque.

The one-way damping mechanism 40 includes a one-way damper body 401, a rotating part 402, and a second end cover 403. One end of the rotating part 402 is connected to the one-way damper body 401, another end of the rotating part 402 is engaged with the connecting hole 202c, the one-way damper body 401 is located in the second groove 202b, the one-way damper body 401 and the second end cover 403 are connected, and the second end cover 403 is fixed on the reel 201. Adjusting or selecting a resistance value of the one-way damping mechanism equal to a sum of the rolling torque and a friction force of the coil spring. The friction force includes a friction force between the finger coil spring and the bearing, and a friction force between the first supporting assembly and the second supporting assembly, and so on.

The one-way damper body 401 includes a housing, a one-way needle bearing, a damping rotor, and the like. The one-way needle bearing is connected to the rotating part 402, the damping rotor is connected to the one-way needle bearing, a damping oil is filled in the housing, and the one-way needle bearing and the damping rotor are located in the housing. The one-way needle bearing is matched with the damping oil to adjust a resistance generated by the one-way damping mechanism 40. Since the damping oil is made of special silicone oil, when the damping rotor rotates, the damping oil will generate a torque, which is transmitted to the one-way needle bearing. A resistance generated by the one-way damping mechanism 40 is determined by a viscosity of the damping oil and a contact area between the damping oil and the damping rotor. When the viscosity of the damping oil is high and the contact area between the damping oil and the damping rotor is large, the resistance generated by the one-way damper 40 is greater. Conversely, when the viscosity of the damping oil is low and the contact area between the damping oil and the damping rotor is small, the resistance generated by the one-way damper 40 is smaller.

The limiting mechanism 50 is configured to carry out a hardware fixed connection between the first supporting assembly 301 and the second supporting assembly 302 when an area of the limiting mechanism 50 for the supporting surface 100*a* is a predetermined area, to prevent the first supporting assembly 301 and the second supporting assembly 302 from sliding when an area of the supporting surface 100*a* is the predetermined area between the first supporting assembly 301 and the second supporting assembly 302, so that the flexible display module displays corresponding to the fixed display surface.

The limiting mechanism 50 includes a limiting rotor 501, a limiting groove 50*a*, a sliding groove 50*b*, and a rotation auxiliary member 502.

The limiting rotor 501 is rotatably connected to the first supporting assembly 301. The first support plate 3011 disposed on a side of the first supporting assembly 301 is provided with a second connecting portion 3012. The second connecting portion 3012 is located on an end near the second supporting assembly 302, and the limiting rotor 501 is connected to the second connecting portion 3012 by a rotor rivet column.

The limiting rotor 501 includes a first end and a second end corresponding to each other, the limiting rotor 501 further includes a third end and a fourth end disposed corresponding to each other, the third end is connected between the first end and the second end, and the fourth end is connected between the first end and the second end, wherein the first end and the second end disposed corresponding to each other of the limiting rotor 501 are both engaging ends, and the third end and the fourth end disposed corresponding to each other of the limiting rotor 501 are both sliding ends. The limiting rotor 501 needs to rotate 90 degrees from the engaging end to the sliding end.

The limiting groove 50*a* is provided on the second supporting assembly 302. The limiting rotor 501 is engaged to the limiting groove 50*a* when the area of the supporting surface 100*a* is a predetermined area, so that the first supporting assembly 301 and the second supporting assembly 302 are firmly fixed by the cooperation between the limiting rotor 501 and the limiting groove 50*a*. The limiting rotor 501 is in the first state when the limiting rotor 501 is engaged with the limiting groove 50*a*, and the limiting rotor in the first state means that a working end of the limiting rotor 501 is an engaging end. The first end or the second end of the limiting rotor 501 is engaged with the limiting groove 50*a* when the limiting rotor 501 is engaged to the limiting groove 50*a*.

The sliding groove 50*b* is provided on the second supporting assembly 302. The limiting rotor 501 slides along the sliding groove 50*b* when the first supporting assembly 301 and the second supporting assembly slide relatively. The limiting rotor is in the second state when the limiting rotor 501 slides along the sliding groove 50*b*, and the limiting rotor 501 in the second state means that the working end of the limiting rotor 501 is the sliding end. The third or fourth end of the limiting rotor is located in the sliding groove when the limiting rotor is in the second state.

The limiting rotor 501 is configured to switch between the first state and the second state by rotating (for example, 90 degrees) to adapt to the relative sliding and fixing state between the first supporting assembly 301 and the second supporting assembly 302.

The rotation auxiliary member 502 is arranged on the second supporting assembly 302 and corresponding to the sliding groove 50*b*, and the sliding groove 50*b* and the limiting groove 50*a* are located on the same end surface of the second supporting assembly 302 and arranged correspondingly.

Specifically, the rotation auxiliary member 502 is disposed on the second end surface 302*c* of the second supporting assembly 302, the sliding groove 50*b* is defined in the first end surface 302*b* of the second supporting assembly 302, and the first end surface 302*b* and the second end surface 302*c* are perpendicular to each other. The first end surface 302*b* is located on a back of the supporting surface 100*a* and is parallel to the supporting surface 100*a*, and the second end surface 302*c* is located on the back of the supporting surface 100*a* and is perpendicular to the supporting surface 100*a*. The first end surface 302*b* is a surface of the supporting body 3022 facing away from the supporting surface 100*a*. The second end surface 302*c* is an inner side surface of a side plate of the second supporting assembly 302 close to the first supporting assembly 301. The rotation auxiliary member 502 and the second connecting portion 3012 are located on the same side of the flexible display device 100. The sliding groove 50*b* is located at an edge of the second supporting assembly 302 close to the second connecting portion 3012.

In this embodiment, the predetermined area corresponds to the maximum area of the supporting surface 100*a*, so as to prevent the first supporting assembly 301 and the second supporting assembly 302 from being separated when the supporting surface 100*a* slides to the maximum, and making the first supporting assembly 301 and the second supporting assembly 302 are fixed between them.

In this embodiment, the rotation auxiliary member 502 includes a V-shaped protrusion, the limiting rotor 501 includes a V-shaped groove, and an angle of a vertex of the V-shaped protrusion is different from an angle of a vertex of the V-shaped groove, so that the rotation auxiliary member 502 plays functions to assist the rotation of the limiting rotor 501. The limiting rotor 501 rotates by a preset angle when the V-shaped groove of the limiting rotor 501 stops against the V-shaped protrusion of the rotating auxiliary member 502. The preset angle is less than 90 degrees to prevent the limiting rotor 501 from being stuck on the rotation auxiliary member 502 and cannot rotate when the angle of the vertex of the V-shaped protrusion is equal to the angle of the vertex of the V-shaped groove. The end surface of the limiting rotor 501 with a V-shaped groove is the engaging end, the two end surfaces adjacent to the limiting end are sliding ends, and the sliding ends are flat.

Further, the angle of the vertex of the V-shaped protrusion is less than the angle of the vertex of the V-shaped groove, for example, the vertex of the V-shaped protrusion is an acute angle, and the vertex of the V-shaped groove is an obtuse angle, so as to help to easier rotate when the limiting rotor 501 abuts against the rotation auxiliary member 502.

The limiting rotor 50 is configured to move relative to the rotation auxiliary member according to a predetermined path when in a second state, and abut against the rotation auxiliary member 502, so as to rotate 90 degrees toward a first direction from the second state to a first state.

In the following, the first supporting assembly 301 is stationary and the second supporting assembly 302 moves as an example to describe the rotation of the limiting rotor from the second state to the first direction by 90 degrees to the first state.

The second supporting assembly 302 moves away from the first supporting assembly 301, the limiting rotor 501 is configured to slide the sliding end along the sliding groove 50b, and the limiting rotor 501 abuts against the rotation auxiliary member 502, as shown in FIG. 12(A).

The second supporting assembly 302 continues to move away from the first supporting assembly 301, and the limiting rotor 501 is configured to rotate in the first direction to the first transition state when it is in the second state and abuts against the rotation auxiliary member 502. The engaging end of the limiting rotor 501 abuts against the rotation auxiliary member 502 when the limiting rotor 501 abuts against the rotation auxiliary member 502, and the engaging end of the limiting rotor 501 is affected by the force of the collision with the rotation auxiliary member 502, and rotate to the first transition state under the action, the angle from the second state to the first transition state is less than 90 degrees, the first direction is clockwise, as shown in FIG. 12(B). An interface between the engaging end and the sliding end of the limiting rotor 501 is in contact with the sliding groove 50b when the limiting rotor 501 is in the first transition state.

The second supporting assembly 302 moves toward the first supporting assembly 301, and the limiting rotor 501 is also configured to slide along the sliding groove 50b when in the first transition state, that is, the interface between the engaging end and the sliding end of the limiting rotor 501 moves along the sliding groove 50b, as shown in FIG. 12(C).

The second supporting assembly 302 continues to move toward the first supporting assembly 301, and the limiting rotor 501 is also configured to rotate in the first direction to the second transition state under the action of inertial force when in the first transition state, as shown in the FIG. 12(D). The rotation angle when the limiting rotor 501 rotates from the first transition state to the second transition state is less than 90 degrees. The interface between the engaging end and the sliding end of the limiting rotor 501 moves along the sliding groove 50b when the limiting rotor 501 rotates from the first transition state to the second transition state.

After the rotation auxiliary member 502 is distanced a distance away from the limiting rotor 501, the second supporting assembly 302 moves in a direction away from the first supporting assembly 301, and the rotation auxiliary member 502 stops at the sliding end of the limiting rotor 501, as shown in FIG. 12 (E).

The second supporting assembly 302 continues to move in the direction away from the first supporting assembly 301, and the limiting rotor 501 is also configured to rotate in the first direction to the first state when in the second transition state and abuts against the rotation auxiliary member 502. The sliding end of the limiting rotor 501 rotates from the second transition state to the first state under the action of the impact force applied by the rotation auxiliary member 502. Since the limiting groove 50a is arranged close to the rotation auxiliary member 502, the engaging end of the limiting rotor 501 is engaged to the limiting groove 50a, as shown in FIG. 12(F).

The second supporting assembly 302 moves toward the first supporting assembly 301, and a distance between the rotation auxiliary member 502 and the limiting rotor 501 increases, as shown in FIG. 12(G).

The second supporting assembly 302 continues to move toward the first supporting assembly 301, and the limiting rotor 501 rotates 90 degrees from the first state to the second state, and moves along the sliding groove 50b, as shown in FIG. 12(H). The limiting rotor can automatically turn to release the limit.

The descriptions of the above embodiments are only used to help understand the technical solutions and core ideas of the present disclosure; those of ordinary skill in the art should understand that they can still modify the technical solutions described in the foregoing embodiments, or modify some of the technologies. The features are equivalently replaced; and these modifications or replacements do not cause the essence of the corresponding technical solutions to deviate from the scope of the technical solutions of the embodiments of the present disclosure.

What is claimed is:

1. A flexible display device, comprising:
   a flexible display module;
   a supporting mechanism comprising a first supporting assembly and a second supporting assembly disposed corresponding to each other, the first supporting assembly and the second supporting assembly configured to slide relatively to provide a supporting surface which changes in area to the flexible display module, and
   a limiting mechanism comprising a limiting rotor and a limiting groove, the limiting rotor rotatably connected to the first supporting assembly, the limiting groove defined in the second supporting assembly, wherein the limiting rotor is engaged with the limiting groove when an area of the supporting surface is a predetermined area, the limiting mechanism further comprises a sliding groove provided in the second supporting assembly, and the limiting rotor slides along the sliding groove when the first supporting assembly and the second supporting assembly slide with respect to each other;
   the limiting mechanism further comprises a rotation auxiliary member arranged on the second supporting assembly and corresponding to the sliding groove, the sliding groove and the limiting groove are defined in a same end surface of the second supporting assembly and arranged correspondingly to each other, and the limiting rotor is configured to move relative to the rotation auxiliary member according to a predetermined path when in a second state, and abut against the rotation auxiliary member, so as to rotate 90 degrees toward a first direction from the second state to a first state, wherein the limiting rotor is in the first state when the limiting rotor is engaged with the limiting groove; and the limiting rotor is in the second state when the limiting rotor slides along the sliding groove.

2. The flexible display device as claimed in claim 1, wherein the limiting rotor is configured to rotate toward the first direction to enter a first transition state when the limiting rotor is in the second state and abuts against the rotation auxiliary member; the limiting rotor is also configured to rotate toward the first direction to a second transition state under an inertial force when in the first transition state; and the limiting rotor is also configured to rotate toward the first direction to enter the first state when the limiting rotor is in the second transitional state and abuts against the rotation auxiliary member.

3. The flexible display device according to claim 2, wherein the limiting rotor comprises a first end and a second end disposed corresponding to each other, the limiting rotor further comprises a third end and a fourth end disposed corresponding to each other, the third end is connected between the first end and the second end, and the fourth end is connected between the first end and the second end, wherein the first end and the second end disposed corresponding to each other of the limiting rotor are both engaging ends, and the third end and the fourth end disposed corresponding to each other of the limiting rotor are both sliding ends;

the first end or the second end of the limiting rotor is engaged in the limiting groove when the limiting rotor is engaged in the limiting groove;

the third end or the fourth end of the limiting rotor is located in the sliding groove when the limiting rotor is in the second state; and an interface between the engaging end and the sliding end of the limiting rotor is in contact with the sliding groove when the limiting rotor is in the first transition state and the second transition state.

4. The flexible display device as claimed in claim 1, wherein the rotation auxiliary member is disposed on the second end surface of the second supporting assembly, the sliding groove is defined in a first end surface of the second supporting assembly, the first end surface and the second end surface are perpendicular to each other, and the limiting groove is arranged at one end of the sliding groove close to the rotation auxiliary member.

5. The flexible display device as claimed in claim 4, wherein the first end surface is located on a back of the supporting surface and parallel to the supporting surface, and the second end surface is located on the back of the supporting surface and perpendicular to the supporting surface.

6. The flexible display device as claimed in claim 1, wherein the predetermined area corresponds to a maximum area of the supporting surface.

7. The flexible display device as claimed in claim 1, wherein the rotation auxiliary member comprises a V-shaped protrusion, the limiting rotor comprises a V-shaped groove, and an angle of a vertex of the V-shaped protrusion is different from an angle of a vertex of the V-shaped groove.

8. The flexible display device as claimed in claim 7, wherein the angle of the vertex of the V-shaped protrusion is less than the angle of the vertex of the V-shaped groove.

9. The flexible display device as claimed in claim 1, wherein the first supporting assembly comprises a plurality of first support plates, the second supporting assembly comprises a plurality of second support plates, each of the second support plates is located between two adjacent first support plates, and the first support plates and the second support plates are engaged with each other in a direction perpendicular to the supporting surface.

10. The flexible display device as claimed in claim 9, wherein a longitudinal section of the first support plates has one of a T-shape or an inverted T-shape, and a longitudinal section of the second support plates has the other one of the T-shape or the inverted T-shape.

11. The flexible display device as claimed in claim 9, wherein a longitudinal section of the first support plates is of an inverted T-shape, and a longitudinal section of the second support plates is of a T-shape, a surface of the second supporting assembly close to the supporting surface is provided with a plurality of protruding strips, a gap is defined between two adjacent protruding strips, the first support plates are provided on a portion of the two adjacent protruding strips, the second support plates are arranged in a portion of the gap, and the gap between the two adjacent protruding strips where the first support plates are disposed is adjacent to the gap where the second support plate is arranged in.

12. The flexible display device as claimed in claim 11, wherein the first support plates comprise a first vertical portion and a first lateral portion perpendicular to the first vertical portion, the first vertical portion is located in a middle position of the first lateral portion, the second support plates comprise a second vertical portion and a second lateral portion perpendicular to the second vertical portion, the second vertical portion is located in a middle position of the second lateral portion, the first lateral portion of the first support plates and the second lateral portion of the second support plates are engaged with each other, the first vertical portion of the first support plates and the second lateral portion of the second support plates constitute the supporting surface, the first lateral portion of the first support plates is disposed on the two adjacent protruding strips, and the second vertical portion of the second support plates is disposed in the gap.

13. The flexible display device as claimed in claim 1, wherein the flexible display device further comprises a rolling mechanism, the rolling mechanism is fixedly connected to the first supporting assembly, and the flexible display module comprises a protective cover plate; and a first end of the protective cover plate is fixed to the rolling mechanism, a second end of the protective cover plate is fixed to the second supporting assembly, and the first end of the protective cover plate and the second end of the protective cover plate are disposed corresponding to each other.

14. The flexible display device as claimed in claim 13, wherein the protective cover plate comprises a stretch-resistant layer, and a material of the stretch-resistant layer is selected from transparent polyimide or polyethylene terephthalate.

15. The flexible display device as claimed in claim 13, wherein the flexible display device further comprises a one-way damping mechanism, the rolling mechanism comprises a rolling shaft and a rolling spring assembly, the rolling spring assembly is connected to a first end of the rolling shaft and configured to apply a driving force to the rolling shaft to rotate in a second direction, the one-way damping mechanism is connected to a second end of the rolling shaft and configured to apply resistance to the rolling shaft rotating in the second direction, and the first end of the rolling shaft and the second end of the rolling shaft are disposed corresponding to each other.

16. The flexible display device as claimed in claim 15, wherein the rolling mechanism further comprises a reel, the reel comprises an accommodating cavity, the rolling shaft is arranged in the accommodating cavity of the reel, the rolling spring assembly comprises a coil spring and a first end cover, one end of the coil spring is connected to the rolling shaft, another end of the coil spring is connected to the first end cover, and the first end cover is fixedly connected to the reel.

\* \* \* \* \*